June 23, 1925. 1,543,047
D. BEHRSING ET AL
TILTING STEERING WHEEL FOR MOTOR VEHICLES
Filed Nov. 6, 1922   3 Sheets-Sheet 1

Inventors,
David Behrsing,
Clarence A. Godshalk.
By John S. Barker
Attorney

June 23, 1925. 1,543,047
D. BEHRSING ET AL
TILTING STEERING WHEEL FOR MOTOR VEHICLES
Filed Nov. 6, 1922    3 Sheets-Sheet 2

Inventors,
David Behrsing,
Clarence A. Godshalk.

By John S. Barker
Attorney

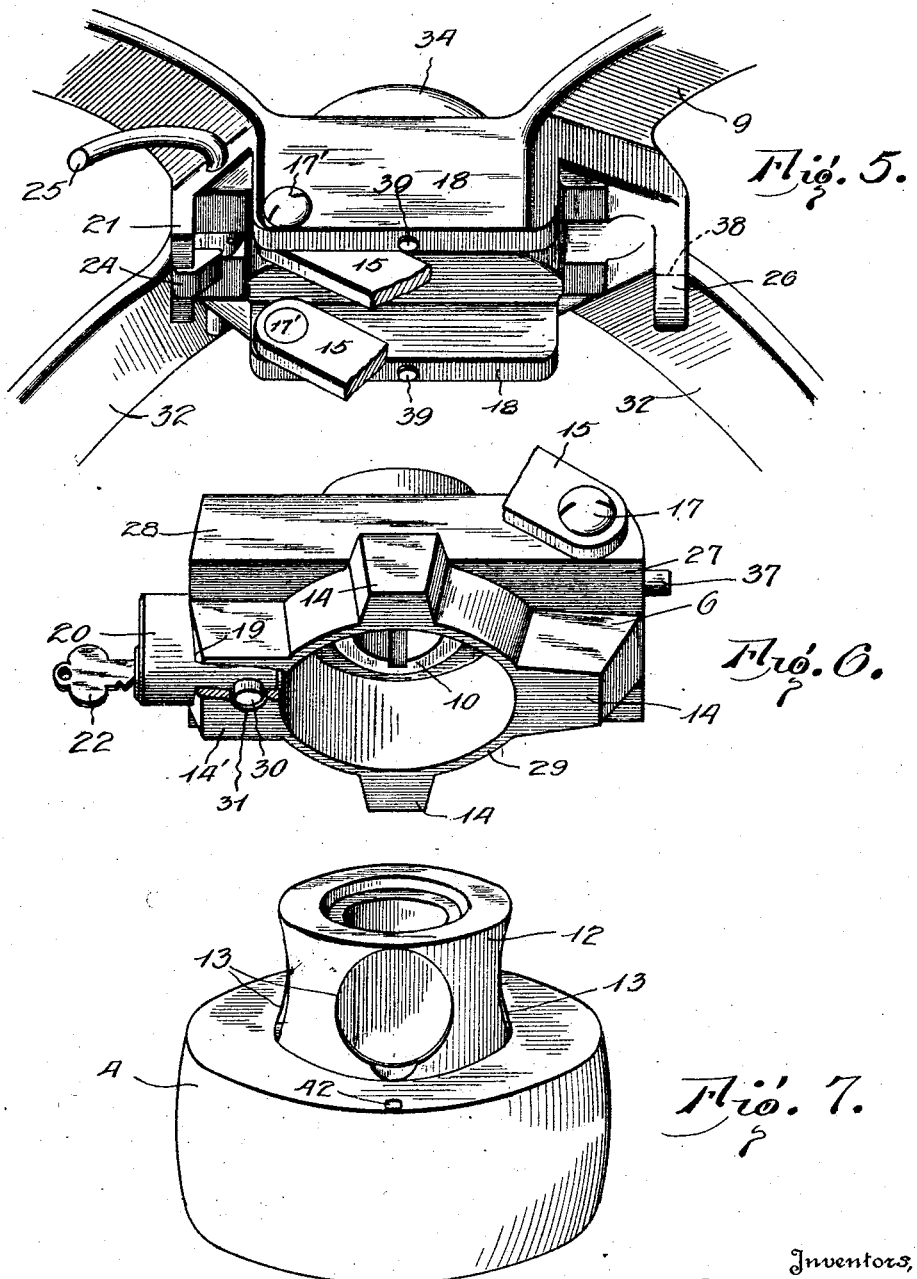

Patented June 23, 1925.

1,543,047

UNITED STATES PATENT OFFICE.

DAVID BEHRSING AND CLARENCE A. GODSHALK, OF PHILADELPHIA, PENNSYLVANIA, ASSIGNORS TO FOX AUTOMOTIVE PRODUCTS CORPORATION, OF PHILADELPHIA, PENNSYLVANIA, A CORPORATION OF DELAWARE.

TILTING STEERING WHEEL FOR MOTOR VEHICLES.

Application filed November 6, 1922. Serial No. 599,292.

*To all whom it may concern:*

Be it known that we, DAVID BEHRSING and CLARENCE A. GODSHALK, citizens of the United States, residing at Philadelphia, in the county of Philadelphia and State of Pennsylvania, have invented certain new and useful Improvements in Tilting Steering Wheels for Motor Vehicles, of which the following is a specification.

Our invention relates to steering mechanism for motor vehicles, particularly to that type employing a hand wheel that is adapted to be disconnected at the pleasure of the operator from the steering shaft, so that when so disconnected the shaft cannot be turned for steering the vehicle, and that is also adapted to be tilted in order to give more room to the driver for leaving or taking his seat in the vehicle. We have represented our invention as applied to the steering mechanism of a car of the Ford type, although it is not limited to cars of that type.

In the accompanying drawings—

Fig. 5 is a perspective view, enlarged and with parts broken away, illustrating the tilting portion of the spider hub.

Fig. 6 is a perspective view, also enlarged and with parts broken away, illustrating the non-tilting portion of the spider hub.

Fig. 7 is a perspective view, enlarged, of the cap of the gear case.

Figure 2:
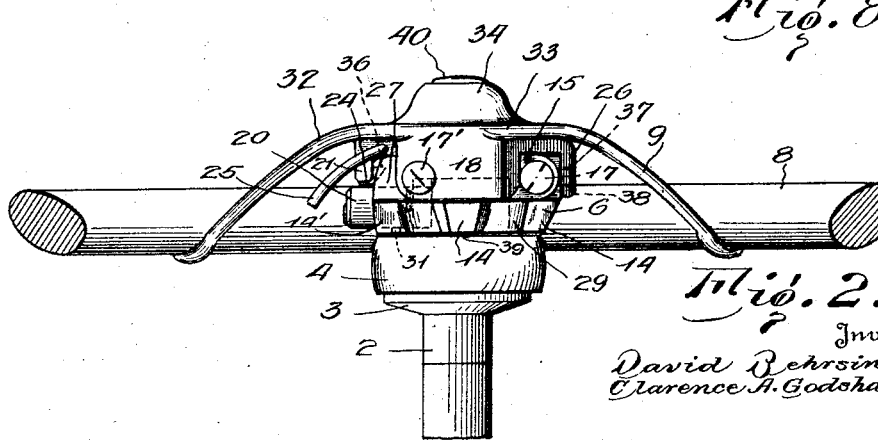
Fig. 2 is a similar view representing the wheel in operative position for steering.
Figure 3:
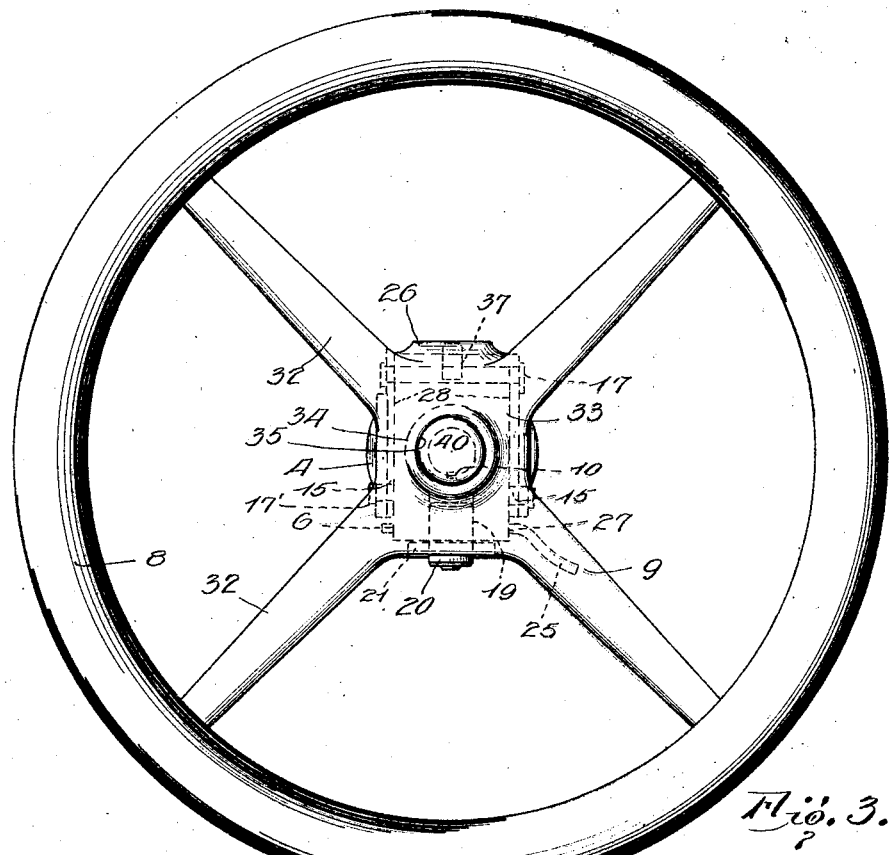
Fig. 3 is a top plan view showing the parts in the position indicated in Fig. 2.
Figure 4:
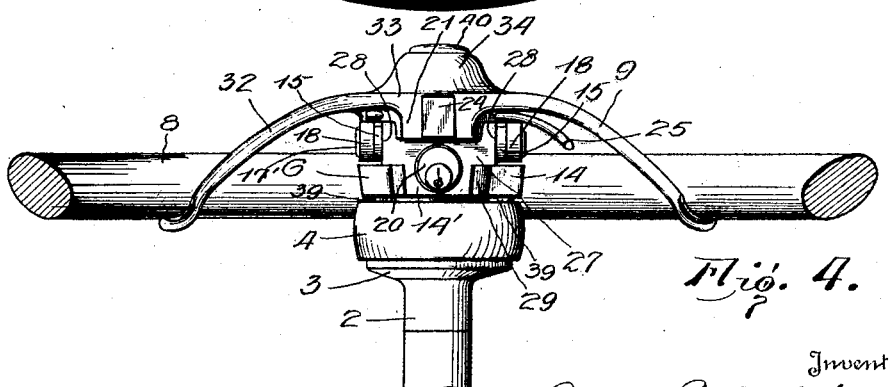
Fig. 4 is an elevation representing the parts as shown in Fig. 2, but taken from another point of view.

Referring to the drawings 2 indicates the stationary non-rotatable column of the steering mechanism of a motor vehicle, 3 the gear case supported at the upper end of such column, and 4 the cap that closes the upper open end of the gear case. The rotatable steering shaft 5 has keyed to it a part, designated 6, that we term the spider hub, because the spider 9 that supports the rim 8 of the steering wheel is connected thereto and the part 6 serves as the hub therefor when the wheel is in use. 7 designates the nut engaging the screw-threaded end of the shaft 5 and holding the spider hub 6 in place. The spider hub is preferably of the construction represented in Figs. 5, 6 and 7. It comprises a non-tilting portion consisting of a block 27, of rectangular form in outline having parallel flat sides 28 and keyed to the shaft 5 at its center portion, 10. From the underside of the block 27 extends a cylindrical projection 29 recessed to receive and fit over an extension 12 from the upper face of the cap 4 of the gear case. A plurality of lugs 14, preferably four in number, extend out radially from the extension 12 and serve a purpose that will presently be described. One of these lugs, designated 14', and the one which we term the front lug, is larger than the others, and in it is formed a recess 19 constituting a seat for a lock 20. This lock is preferably a key-operated lock with a cylindrical body fitting the recess 19, in which it is adapted to slide bodily. The extension 12, which is concentric with the shaft 5, has formed in it a plurality, preferably four, of recesses 13 that are adapted to receive the inner end of the body of the lock 20 when that is moved inward. The lock is formed with a radial bolt 30 that is key-operated and is preferably normally projected outward by a spring so as to occupy a recess 31 in the lug 14' and thus hold the lock in its outer position and free from the extension 12 whenever the lock case is drawn out as represented in Fig. 2. The extension 12 being carried by a part of the gear case, is stationary, while the lock, being carried by the spider hub, always turns with the steering wheel. When the car is running and the steering wheel is in use the lock 20 occupies the position represented in Fig. 2, that is, it is in its outer position, and the wheel is free to turn relative to the gear case, the skirt or extension 29 of the spider hub moving freely about the extension 12. When the driver desires to leave the car the spider hub is locked to the extension 12, this being accomplished by turning the rotatable barrel of the lock, by the use of a key 22, so as to withdraw the bolt 30 from the recess 31, whereupon the lock 20 is bodily moved inwardly until its inner end is seated in one of the recesses 13 of the cylindrical extension 12, when the rotatable barrel of the lock, either by spring or key, is turned to again project the bolt 30, which now lies inside of the inner face of the skirt or projection 29, preventing the lock case from being moved in its seat until the bolt is again retracted by the use of the proper key.

The non-tilting portion of the spider hub 6 is connected with the central portion of the spider 9 of the tilting steering wheel. This spider consists of a set of spokes 32 connected at their inner ends by a central plate 33. The plate is formed at its center with a dome-like projection 34 through which is a central aperture 35, and on its underside has a pair of opposite parallel side flanges 18, 18, a rear flange 26, and a front flange 21.

Figure 1:
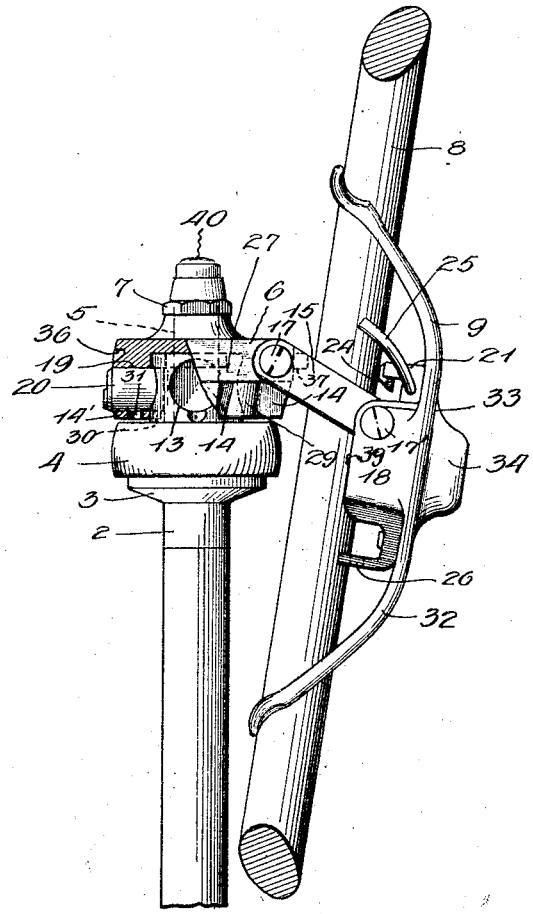
Figure 1 is a view partly in elevation and partly in section illustrating our invention, the steering mechanism being represented as locked and the steering wheel as tilted.
Figure 8:
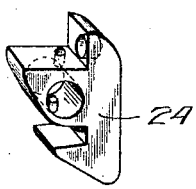
Fig. 8 is a perspective view, also enlarged, illustrating detached the spring-operated catch employed to hold together and in working position the tilting and non-tilting portions of the spider hub.

The non-tilting portion of spider hub is connected with the center plate 33 of the tilting wheel by a pair of links 15. These links are pivotally connected, each at one end, with the block 27 of the spider hub by a bolt 17, and, at their other ends, with the side flanges 18 of the center plate by bolts 17'. When the parts just referred to are in working position as represented in Fig. 2 the links 15 lie between the flat side faces 28 of the block 27 and the inner faces of the depending side flanges 18, practically filling the spaces between these parts. The links and bolts described constitute pivotal connections between the spider hub 6 and the wheel of such nature that the wheel may be tilted and may also be bodily swung so that it may be caused to assume a position behind the column 2, such as indicated in Fig. 1. The axes of the pivots or bolts 17, 17' are parallel so that the several parts of the wheel are maintained in the same planes throughout all their movements, which planes cut the said axes at right angles. The links 15 are parallel with each other and in the particular arrangement shown they are spaced apart, and are side by side as distinguished from being in tandem, and are each connected at one end with the block or other element secured to and turning with the steering shaft, and at one side of the axis of such shaft, while the opposite end is pivoted to the central member of the wheel, and on the opposite side of the axis of the steering shaft from that referred to is the location of the first mentioned pivots, when the wheel is in operating position for turning the steering shaft.

The front flange 21 of the center plate of the wheel is recessed to receive a pivoted spring catch 24 which is provided with an operating handle 25. The catch 24 is adapted to engage with an undercut portion 36 of the block 27 to hold the plate 33 and block 27 united so long as the catch is in engagement with the said undercut portion 36.

A rigid fixed pin 37 projects from the rear end of the block 27 of the spider hub and is adapted to lie within the recess or aperture 38 formed in the rear flange, 26, of the center plate when the wheel is in position for use and in working engagement with the spider hub.

The center plate 33 of the wheel covers the spider hub 6 and the end of the steering shaft when the wheel is in working position. The central portion of this plate is dome-shaped as indicated at 39, and through this dome is a central opening 35.

40 represents the push button or contact piece of an electric switch that controls the horn or signal carried by the car. This switch device is supported by the steering shaft or by the nut 7 thereon. The specific construction of the device of which the contact 40 is a member, and its particular use are quite immaterial so far as this invention is concerned. As stated, it may control the sounding of a signal on the car, or any other electrically operated device, or it may be a mechanically or pneumatically operated control device. A horn button is typical, and when that expression is herein used it is employed in a typical sense. When the parts are assembled and in position for use the contact piece 40 extends through the opening 35 in the dome portion of the center plate of the wheel in convenient location to be touched by the driver of the car. When the wheel is tilted or swung it moves freely without interfering with the contact button, which latter remains stationary, so that the electric wires or other parts which may be associated therewith are not interfered with by movements of the wheel.

Short spring-supported pins, 39, are mounted in the block 27 with their outer or upper ends projecting a little above the upper faces thereof. They are engaged by the center plate of the wheel and pushed into their sockets, compressing the springs which back them, when the wheel is moved into working position and there held by the catch 24. When the catch is released the reaction of the springs operating through the pins 39 lifts the wheel, tilting it slightly on its pivot 17 and putting it in position to be easily tilted and rocked by hand.

The operation of the device is as follows: When the parts occupy the position represented in Fig. 2 the wheel is in condition for use, being connected with the steering shaft and free to turn. The lock 20 is in its outermost position, disengaging the extension 12 of the gear case. The central portion of the wheel, as will be seen, has good working engagement with the spider hub secured to the steering shaft. The side flanges 18 embrace the block 27 of the spider hub, the connecting links 15 fully occupying the spaces between the said flanges and the side faces of the block, thus affording lateral engagement. The pin 37 lying in the recess 38 of the rear flange 26 constitutes another connection between the wheel and the spider hub, and gives engagement at the rear; while the spring catch 24 gives engagement at the front as well as holds the wheel and spider hub together in the relations just described. Should the driver desire to leave the car he inserts the key 22 into the lock, turns the barrel thereof to withdraw the bolt 30 and pushes the lock 20 bodily inward until its inner end engages with one of the recesses in the extension 12 of the gear case. The key may now be removed and the wheel will be locked against turning so the car cannot be steered. Should the driver desire to tilt the wheel, he releases the catch 24 and turns the wheel upon the rear connecting bolt 17. After the parts have been tilted to disengage the pin 37 from the rear flange 26 the wheel may be swung back, the links permitting the wheel to clear the parts at the head of the column, until it comes to the position represented in Fig. 1, where the wheel is well out of the way of the driver, occupying a position between the steering column and the instrument board of the car. Tilting and swinging movements of the wheel do not in any wise interfere with the horn button 40, as has been described.

Whenever the car is locked one or another set of the lugs 14 lie over and conceal the pins 42 that are employed to hold the cap of the gear case from turning. The lugs thus prevent tampering with these locking pins whenever the wheel is locked, but when the wheel is unlocked, may be freely moved to expose the pins.

We do not claim in this case the combination with a stationary steering column, a gear case at the upper end thereof having a removable cap, locking pins for holding the cap in place on the gear and a steering shaft turning in the column, of a steering wheel the spider hub of which is secured to the steering shaft and is formed with lugs that cover the ends of the locking pins when the wheel is locked, but permits them to be exposed when the wheel is unlocked, and a lock for uniting at will the spider hub to the gear case, as that subject matter is presented and claimed in a sole application for patent filed by Clarence A. Godshalk.

What we claim is:

1. The combination with a steering shaft and a steering wheel for turning it, of double pivotal connections between these two, the pivots being parallel with each other and arranged to permit the wheel to tilt, without bodily movement of translation, about one pivotal axis, and to swing bodily and away from the line of the shaft about the other pivotal axis.

2. The combination of a shaft, a supporting part secured thereto, a wheel for turning the shaft having a central part, and a link connection between the part carried by the shaft and the central part of the wheel, the said connection being pivoted respectively to the said parts, and the axes of the said pivots being parallel.

3. The combination with a shaft and a wheel for turning it, of a parallel link connection between the said parts, the links being pivotally connected toward their opposite ends with the said parts respectively.

4. The combination stated in claim 3 when the link connections comprise a pair of parallel links spaced apart and side by side.

5. The combination of a steering wheel having a spider with a central portion, a steering shaft carrying a part turning therewith, the central part of the wheel spider engaging with the part carried by the shaft when these are in working relationship, and connecting parallel links between and uniting said engaging parts, arranged at the sides of the part carried by the steering shaft arranged to permit the wheel to tilt relative to the shaft-carried part without bodily movement relative thereto, and also to swing bodily away therefrom.

6. The combination of a steering shaft carrying a block with parallel flat sides, a steering wheel with a central part having portions that lie along side of the flat sides of the said block when the parts are in working positions, and link connections between the wheel center and the block carried by the shaft, pivoted respectively to these parts.

7. The combination of a steering shaft carrying a block with parallel flat sides, a steering wheel with a central part having portions that lie along side of the flat sides of the said block when the parts are in working positions, a pair of links adapted to lie close between the flat sides of the latter and the parts of the former which lie alongside thereof, pivotal connections uniting the links respectively with the block and the wheel center, and pivotal connections being with the links near their opposite ends.

8. The combination of a steering shaft having a block at its upper end, a steering wheel having a central spider portion adapted to have direct engagement with the said block to turn the shaft, link connections between these parts permitting the wheel to tilt to break the said engagement, a spring catch for uniting the wheel spider and block at one end, and interengaging parts, which come together when the wheel spider and block are brought into working relationship but separate when the wheel is tilted at the other end.

9. The combination with a steering shaft and a pivotally supported tilting wheel, of a rigid fixed pin carried by the part to which the wheel is pivotally connected, and a socket carried by the steering wheel into which the pin enters when the wheel is brought to working position and from which it is removed when the wheel is tilted.

10. The combination of a steering shaft having a block at its upper end formed with an undercut portion, a steering wheel having a central portion that engages with the block to turn the shaft, connections between these parts permitting the wheel to tilt, a spring catch carried by the wheel for engaging the undercut portion of the block, a handle for operating the catch located within convenient reach of the operator manipulating the wheel, a pin carried by one of the connected parts arranged to enter a socket carried by the other part when the wheel is brought to working position and from which it is removed when the wheel is tilted, the spring catch engaging one end of the block and the pin and socket being at the other end thereof.

DAVID BEHRSING.
CLARENCE A. GODSHALK.